Jan. 8, 1924.  
L. P. GREEN  
SCRAPER  
Original Filed June 24, 1921  
1,480,389
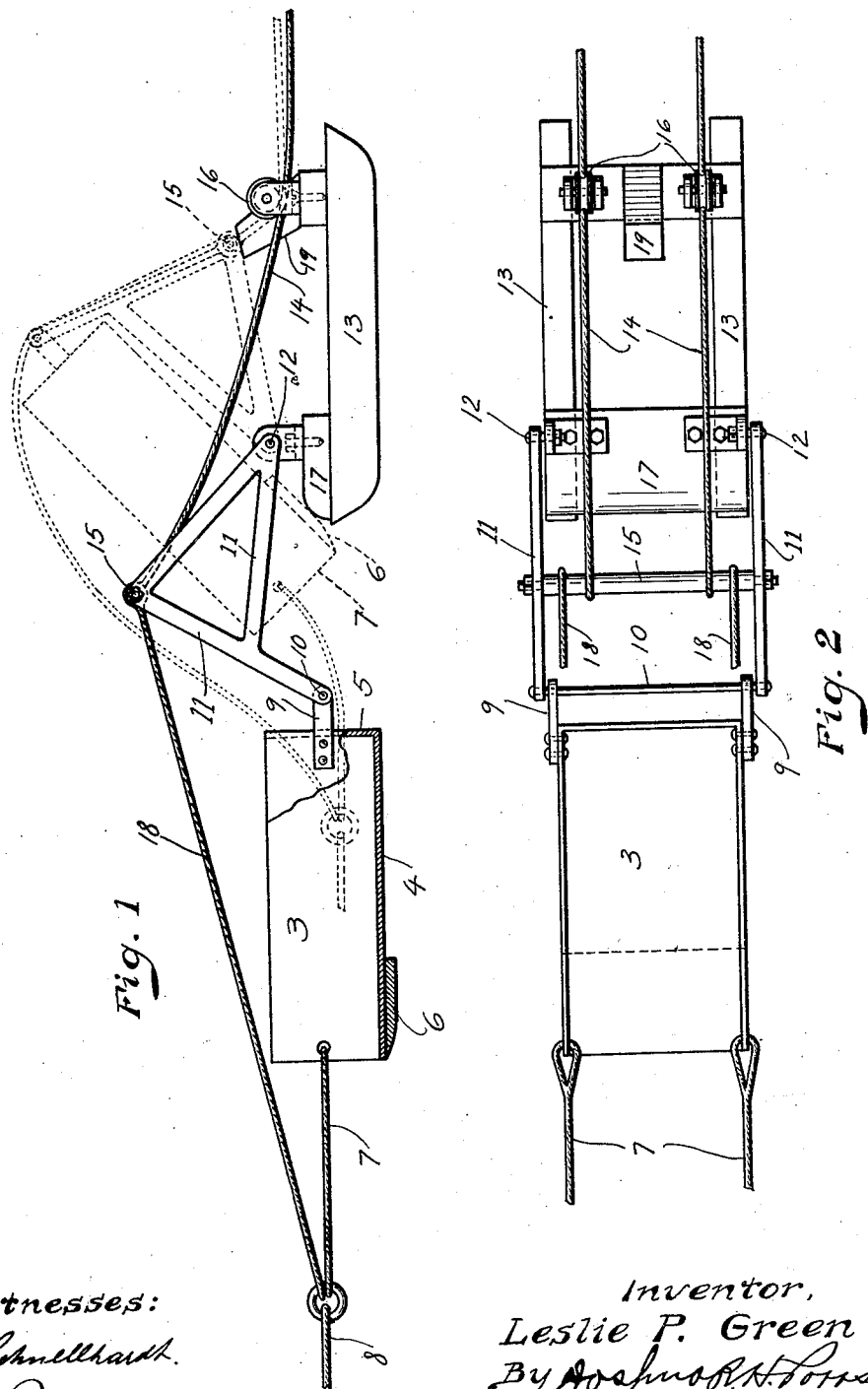

Patented Jan. 8, 1924.

1,480,389

UNITED STATES PATENT OFFICE.

LESLIE P. GREEN, OF CHICAGO, ILLINOIS.

SCRAPER.

Application filed June 24, 1921, Serial No. 479,991. Renewed July 30, 1923.

*To all whom it may concern:*

Be it known that I, LESLIE P. GREEN, a citizen of the United States, and a resident of the city of Chicago, county of Cook, and State of Illinois, have invented certain new and useful Improvements in Scrapers, of which the following is a specification.

My invention relates to improvements in scrapers, especially adapted for moving material, such as earth, sand, gravel, and the like from one position to another, the object of the invention being to provide a simple, automatically operating construction of this character which is highly efficient in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a side view, shown partially in section, of a scraper embodying the invention, and Fig. 2 is a top plan view of the same.

The preferred form of construction as illustrated in the drawings, comprises a scraper member 3 which is preferably substantially rectangular in form with a closed bottom 4 and a closed rear end 5, the front and top being open. The front edge of the bottom 4 is re-enforced by a combined wear and bumper plate 6 as indicated, and branch cables 7 are secured to the front ends of the sides of said scraper member and to a forward drag cable 8 as shown. The sides of the scraper member 3 are provided at the rear with rearwardly extending arms 9 pivotally connected to the lower cross bar 10 of the substantially triangular rocker frames 11 pivoted at 12 on a sled-like member 13. Branch cables 14 are connected with the upper crossbar 15 of the rocker frames 11, being led thereto under guide pulleys 16 as shown. The ends of the branch cables 4 are connected with the usual rear drag cable employed in such scraper mechanisms. A bumper 17 is arranged on the sled 13 to contact with the plate 6 when the scraper member is lifted onto the sled as indicated in the dotted lines in Fig. 1. Branch cables 18 also connect the upper bar 15 of the rocker frames 11 with the forward drag cable 8 as shown.

In use the scraper is operated by dragging the same forwardly over the area of material to be moved by means of the forward drag cable 8 in the usual way. Scraper member 3 collects a load of the material and conveys the same to the desired point in the usual way. By making the scraper member in the form indicated with a closed bottom, the same is capable of carrying a comparatively large load with small expenditure of power. When the point at which it is desired to deposit the carried material is reached, the forward drag cable is slacked away and the rear drag cable operated to draw the parts rearward. The first effect of rearward tension on branch cables 14 will be to swing the rear end of the scraper member upwardly to dump the same and then carry said scraper member onto the sled as indicated by the dotted lines in Fig. 1, the bumper plate 6 contacting with the bumper 17 to jar loose any material still clinging within the scraper member. A suitable stop block 19 is provided on the sled 13 to contact with the crossbar 15 and limit the forward movement of the rocker frame. By this means large quantities of material may be readily transferred from one point to the other and readily discharged when desired by merely reversing the tension on the cables.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A scraper comprising a sled-like member; a scraper member separate from and performing its scraping operations substantially independently of said sled; cables connected to drag said members forward and back; and means operable by said cables whereby said scraper member will be lifted onto said sled when said cables are operated to drag said members back and extended into operative position when said cables are operated to drag said members forward, substantially as described.

2. A scraper comprising a sled-like member; a scraper member separate from and performing its scraping operations substantially independently of said sled; cables connected to drag said members forward and back; and means operable by said cables, whereby said scraper member will be dumped and lifted onto said sled when said cables are operated to drag said members back and extended into operative position when said cables are operated to drag said members forward, substantially as described.

3. A scraper comprising a sled-like member; a scraper member separate from and performing its scraping operations substantially independently of said sled; cables connected to drag said members forward and back; a rocker member mounted on said sled operatively connected with said scraper member; and operative connections between said cables and said rocker member, whereby said scraper member will be lifted onto said sled when said cables are operated to drag said members back and extended into operative position when said cables are operated to drag said members forward, substantially as described.

4. A scraper comprising a sled-like member; a scraper member separate from and performing its scraping operations substantially independently of said sled; cables connected to drag said members forward and back; a rocker member mounted on said sled operatively connected with said scraper member; and operative connections between said cables and said rocker member, whereby said scraper member will be dumped and lifted onto said sled when said cables are operated to drag said members back and extended into operative position when said cables are operated to drag said members forward, substantially as described.

5. A scraper comprising a scraper member; a sled-like member; a rocker member mounted on said sled member; cables connected with said rocker member and arranged to drag the scraper forward and back; a pivotal connection between said rocker member and said scraper member whereby said scraper member will be lifted onto said sled member by rearward rocking of said rocker member; and a connection between the forward end of said scraper member and the forwardly operating cable, substantially as described.

6. A scraper comprising a substantially rectangular scraper member having a closed bottom and rear end but open at its forward end and top; a forward drag cable connected with the forward end of said scraper; a sled; a rocker pivoted on said sled and pivotally connected with the rear end of said scraper member; a rear drag cable operably connected with said rocker; and an operative connection with said rocker and said forward drag cable, substantially as described.

In testimony whereof I have signed my name to this specification in the presence of two subscribing witnesses.

LESLIE P. GREEN.

Witnesses:
JOSHUA R. H. POTTS,
B. G. RICHARDS.